(12) United States Patent
Bishop et al.

(10) Patent No.: US 8,800,430 B2
(45) Date of Patent: Aug. 12, 2014

(54) BEVERAGE MAKER WITH BREW WATER CONTROL SYSTEM

(75) Inventors: John D. Bishop, Decatur, IL (US); Scott A. Mazzini, Springfield, IL (US); Randy D. Pope, Edinburg, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 595 days.

(21) Appl. No.: 11/681,588

(22) Filed: Mar. 2, 2007

(65) Prior Publication Data

US 2007/0214966 A1 Sep. 20, 2007

Related U.S. Application Data

(60) Provisional application No. 60/743,393, filed on Mar. 2, 2006.

(51) Int. Cl.
*A47J 31/40* (2006.01)
*A01K 43/00* (2006.01)

(52) U.S. Cl.
USPC .................. 99/280; 99/295; 99/299; 99/300; 99/304; 99/307; 426/231; 426/433; 426/590

(58) Field of Classification Search
CPC ....................................................... A47J 31/52
USPC ........... 99/279–283, 295, 299, 300, 304–305, 99/307, 302 R; 426/231, 433, 590
See application file for complete search history.

(56) References Cited

U.S. PATENT DOCUMENTS

| 5,375,508 | A * | 12/1994 | Knepler et al. | 99/280 |
| 6,479,086 | B1 * | 11/2002 | Knepler | 426/231 |
| 6,565,906 | B1 * | 5/2003 | Lassota | 426/433 |
| 7,223,427 | B2 * | 5/2007 | Knepler | 426/231 |
| 2004/0221724 | A1 * | 11/2004 | Lowe et al. | 99/299 |
| 2005/0166765 | A1 * | 8/2005 | Lyall, III | 99/280 |
| 2006/0016347 | A1 * | 1/2006 | Girard et al. | 99/295 |

\* cited by examiner

*Primary Examiner* — Dana Ross
*Assistant Examiner* — Ket D Dang
(74) *Attorney, Agent, or Firm* — Barnes & Thornburg LLP

(57) ABSTRACT

A system, method and apparatus for controllably adjusting characteristics of a beverage produced by a beverage system. The characteristics of the beverage may include the strength, flavor, concentration of various flavor components as well as other characteristics. A control is provided for access by a user to adjust the characteristics to a desired level. The user may increment or decrement the level of the characteristics in response to personal preferences. The control provides an interface to control the beverage system.

13 Claims, 4 Drawing Sheets

BEVERAGE MAKER WITH BREW WATER CONTROL SYSTEM

CROSS REFERENCE TO RELATED APPLICATIONS

This patent application claims the benefit of priority under 35 U.S.C. §119(e) to U.S. Provisional Application Ser. No. 60/743,393, filed Mar. 2, 2006. The disclosure set forth in the referenced provisional application is incorporated herein by reference in its entirety, including all information as originally submitted to the United States Patent and Trademark Office.

BACKGROUND

A variety of brewing systems or beverage making apparatus have been developed which utilize methods of distributing water over a brewing substance or combining water or other ingredients with beverage producing ingredients. In some systems, water is controllably turned on and off to controllably dispense water during the production of a beverage. Disclosed is a system for controlling the strength, flavor, or other characteristics of the product produced by the beverage making apparatus.

By way of background, U.S. Pat. No. 5,375,508 to Knepler, assigned to the Assignee of the present application, includes a beverage making apparatus in the form of a brewer which controllably operates the dispensing of brew water or beverage producing water over ground coffee. As the Knepler '508 patent is not limited to coffee but the term "coffee" is referred to herein for convenience. The device in the Knepler '508 patent discloses a brewer which includes a heated water reservoir which dispenses water to a brewing substance container such as a brew funnel for producing a brewed beverage. A controller is provided which controllably operates the dispensing of water to the brewing substance container. In this manner, water is pulsed from the reservoir to the container. This form of beverage brewing and associated equipment is generically referred to in the brewing industry as pulse brew.

Similarly, U.S. Pat. No. 5,388,501 to Hazan shows a beverage brewer in which water is divided into quantities which are used during the brewing process. As noted in the Hazan '501 patent, water is dispensed to pre-wet the grounds and then, subsequently, dispensed in steps or pulses which are spaced in time. The Hazan '501 patent also provides a pulse brew system.

While pulse brew systems or equipment have been developed, they generally are not configured to easily control the pulse brew system for controlling the strength of the coffee. In this regard, prior pulse brew systems have mechanically divided dispensing of water over a predetermined brewing cycle, allowed the user to manually set a variety of controls, provided for automatic setting of controls, and other configurations of the systems. However, it is currently unknown how to easily allow a user to vary the strength or other characteristics of the brewed beverage by an easy control system to control the pulse brew system.

DESCRIPTION OF THE DRAWINGS

The organization and manner of the structure and function of the disclosure, together with the further objects and advantages thereof, may be understood by reference to the following description taken in connection with the accompanying drawings, and in which.

DETAILED DESCRIPTION

Figure 1:
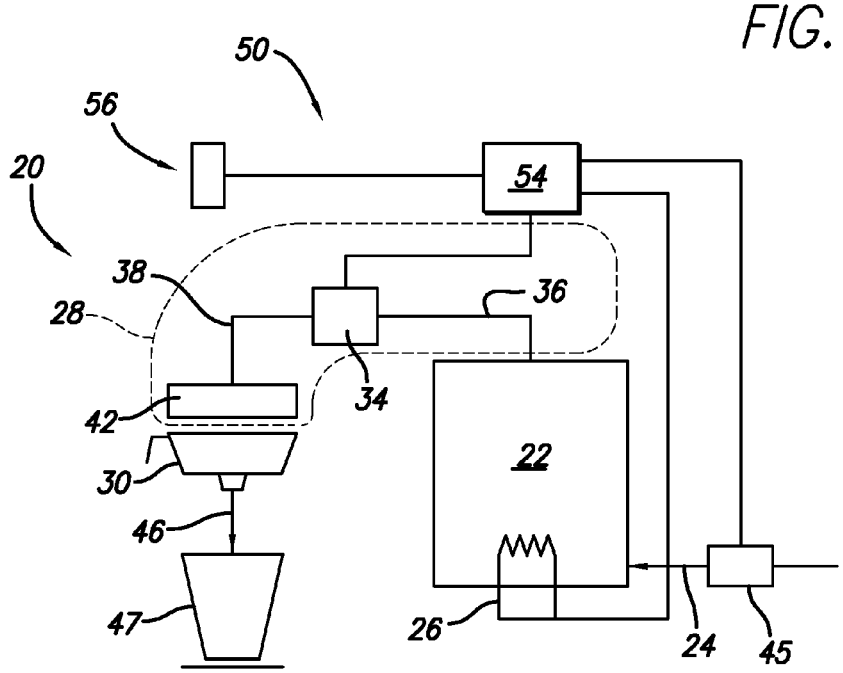
FIG. 1 is a general diagrammatic illustration of a simplified brewing system which employs a control assembly as disclosed.

While the present disclosure may be susceptible to embodiment in different forms, there is shown in the drawings, and will be described herein in detail, one or more embodiments with the understanding that the present description is to be considered an exemplification of the principles of the disclosure and is not intended to be exhaustive or to limit the disclosure to the details of construction and the arrangements of components set forth in the following description or illustrated in the drawings.

Terms including beverage, beverage making, brewed, brewing, brewing substance, brewed liquid, and brewed beverage as may be used herein are intended to be broadly defined as including, but not limited to, the brewing or making of coffee, tea, herbs, other substances and any other form of beverages or food substances. This broad interpretation is also intended to include, but is not limited to any process of dispensing, infusing, steeping, reconstituting, diluting, dissolving, saturating or passing a liquid through or otherwise mixing or combining a beverage substance with a liquid such as water without limitation to the temperature of such liquid unless specified, and will benefit from or find application for the present disclosure. This broad interpretation is also intended to include, but is not limited to beverage substances such as ground coffee, tea, herbs, botonicals, liquid beverage concentrate, powdered beverage concentrate, flaked, granular, freeze dried or other forms of materials including liquid, gel, crystal or other forms of beverage or food materials to obtain a desired beverage or other food product.

While an embodiment of a beverage retaining container such as a brewing funnel for retaining a quantity of brewing substance is described herein, it is contemplated that any form of beverage brewing substance container or configuration such as a pod or cartridge beverage component for containing a brewing substance, may be used. It is further contemplated that the present system could utilize other concentrates such as freeze dried concentrates, gel, liquid, powder or any other form of concentrate which will operate with the disclosed system as well as equivalents thereof and any modifications which might be required to modify the system to be used with such other substances, if necessary.

Further details regarding pulse brewing and brewers are disclosed in U.S. Pat. No. 5,375,508 which is incorporated herein by reference in its entirety.

As shown in FIG. 1, a beverage system 20 is shown in the form of a beverage brewing apparatus. While a beverage brewing apparatus is referred to herein, the disclosure is not to be limited to a brewing apparatus. As noted in this disclosure, the definition of the beverage system is to be expansively interpreted to include brewing apparatus and all other forms of apparatus for producing beverages whether through concentrated or unconcentrated substances. While a drip coffee brewer is disclosed in the embodiment of FIG. 1, it is envisioned that this system may be used with a single cup or pod-type brewer, a prepackaged cartridge such as a "K-cup" or dose brewer, an espresso brewer, as well as any number of other beverage dispensing machines which might combine ingredients loose or contained, prepackaged or user prepared, concentrated or unconcentrated, and water or other beverage making substance to produce a desired beverage 46 for dispensing to a container 47. The present disclosure should not be limited to the specific type of beverage producing system 20 illustrated, nor should it be limited to the type of beverage 46 produced.

By way of illustration but not limitation, the beverage system 20 may include a heated water reservoir 22 of generally known construction. As shown in the present embodiment, the heated water reservoir 22 includes an inlet line 24 which is connected to a pressurized inlet water line having a controllable valve 45 coupled to the controller 54 and a heating device 26. The use of the pressurized water line 24 and heating device 26 is not to be limited and is to be expansively interpreted. Any form of heating device may be applicable to the present disclosure as well as alternatives to the inlet water line 24. For example, the inlet water line may be in the form of a pour-over type of water supply in which water is manually added to the reservoir 22 or a pressurized system in which water is driven from the reservoir under pressure as disclosed in U.S. Provisional Application No. 60/725,824 filed Oct. 11, 2005 and assigned to the assignee of the present application and any subsequently filed applications claiming priority from this application and all of such applications being incorporated herein in its entirety. In general the brewing system includes a water delivery system 28 which facilitates controlled movement of water from the heated water reservoir 22 to a beverage substance container 30. In the embodiment as shown in FIG. 1, the water delivery system includes a controllable valve 34 coupled to a dispensing line 36 and the reservoir 22. On the downstream side of the valve 34, a dispensing line 38 is coupled to a water distribution head or spray head 42. The spray head delivers water to the beverage retaining container 30.

The beverage system 20 includes a control assembly 50 which includes a controller 54 and a control mechanism 56. The controller 54 is coupled to the various components of the brewing system including, but not limited to, the control valve 34, the heating device 26, as well as the control mechanism 56. The controller 54 may be embodied by means of a computer as well as specialized circuitry or chips to perform desired functions. For purposes of illustration, the controller 54 is coupled to the control mechanism 56 to facilitate control of the brewing system 20 by the user. As will be described in greater detail herein, the control mechanism 56 includes, but is not limited to, a control interface 60. The control interface 60 allows the user to control the strength of the beverage 46 produced by the brewing system. By way of illustration, but not limitation, if the brewing system 20 is a coffee brewer, the user can control, by means of the control interface, the strength of the coffee produced by the beverage system. For example, if the user desires to increase the strength of the coffee, they can use the control interface 60 to increase the strength. Similarly, they can decrease the strength of the coffee using the control interface 60. The use of the control interface 60 is to be expansively interpreted to control any type of beverage, for example, the strength or concentration of a carbonated beverage, juice, sport drink, tea or any combination could be controlled by the interface 60.

The term strength is referred to but is intended to be broadly interpreted. The term strength is intended to the flavor or extraction characteristics of the beverage produced by the system. As such the strength controller is intended to allow a user to control the characteristics of the flavor of the beverage produced. For example, the strength controller allows the user to control the amount of water dispensed, the water pulsing patterns and timing and the type of pulsing to be used in a particular brewing routine. The system allows a user to select the desired result by operating a convenient controller without having to manipulate a variety of settings to control programmed characteristics of the operation of the brewer to produce a beverage with the beverage maker have selected characteristics as defined by the operation of the machine.

Figure 4:
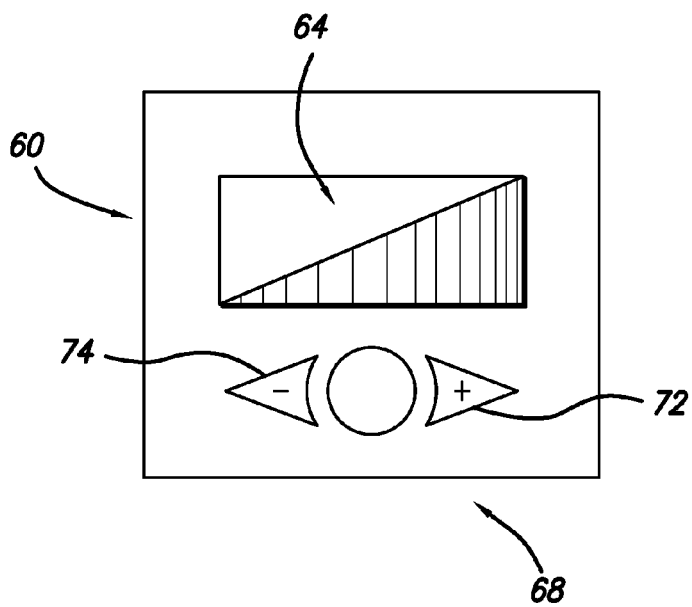
FIG. 4 is a diagrammatic illustration of a control mechanism employed in the present disclosure.

In the embodiment shown in FIG. 4, the control interface may include a display such as an LED, LCD, intensity changing light, audio, or other display 64 and manually controllable switches 68. While an incrementing switch 72 and a decrementing switch 74 are shown, it is envisioned that a single switch could operate which would provide a scrolling or rolling, increasing or decreasing strength or characteristics of the beverage. The use of the control interface 60 is intended to be broadly interpreted to include any form of interface which will facilitate ease of use by the user. The control interface 60 may include a touch panel screen 80 (see FIG. 5) by which a user may touch the screen with their finger 43 and raise or lower indicia 49 on the screen 64 to increase or decrease the strength, change the extraction characteristics of the beverage.

Figure 6:
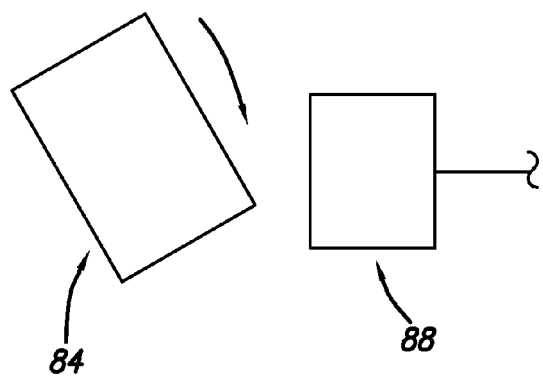
FIG. 6 is a further diagrammatic illustration of a control mechanism using a technology device and a reader.

A technical device 84 may be used in conjunction with a reader 88 coupled to the controller 54 to embody the control interface 60 as shown in FIG. 6. In this regard, the user could pass a technology device 84 next to a reader 88 to increase or decrease the strength, alter the operation of and the resulting characteristics of the coffee produced by the machine. The technology device and reader might be magnetic, conductive, inductive, light based, acoustic or any other form of device to provide control. Initially, it is fully within the scope of the present application to provide motion detection, voice or sound detection, as well as any other interface which allows the user to easily and directly control the strength of the coffee.

Figure 2:
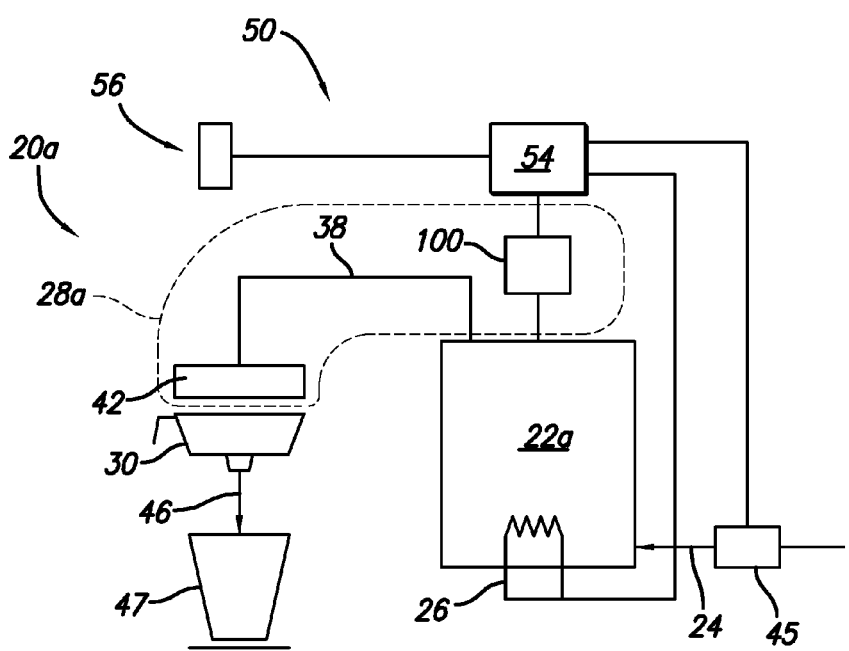
FIG. 2 is another embodiment of a general diagrammatic illustration of a brewer which utilizes an air pump-type system to facilitate movement of water in a brewing system.

With reference to FIG. 2, an embodiment of the brewing system 20*a* is shown. In this embodiment, various components are similar or identical to those as shown in FIG. 1. In FIG. 2, an air pump system 100 is used to move water from the reservoir 22*a* to the water spray head 42. Generally, the remainder of the brewing system is similar or identical to that as shown in FIG. 1. Additionally, modifications may be required to the water reservoir 22*a* to accommodate increased pressures which may be associated with this type of brewer embodiment. An air pump operated brewer is disclosed in U.S. Provisional Application No. 60/725,824 filed Oct. 11, 2005 and assigned to the assignee of the present application and any subsequently filed applications claiming priority from this application and all of such applications being incorporated herein in its entirety.

Figure 3:
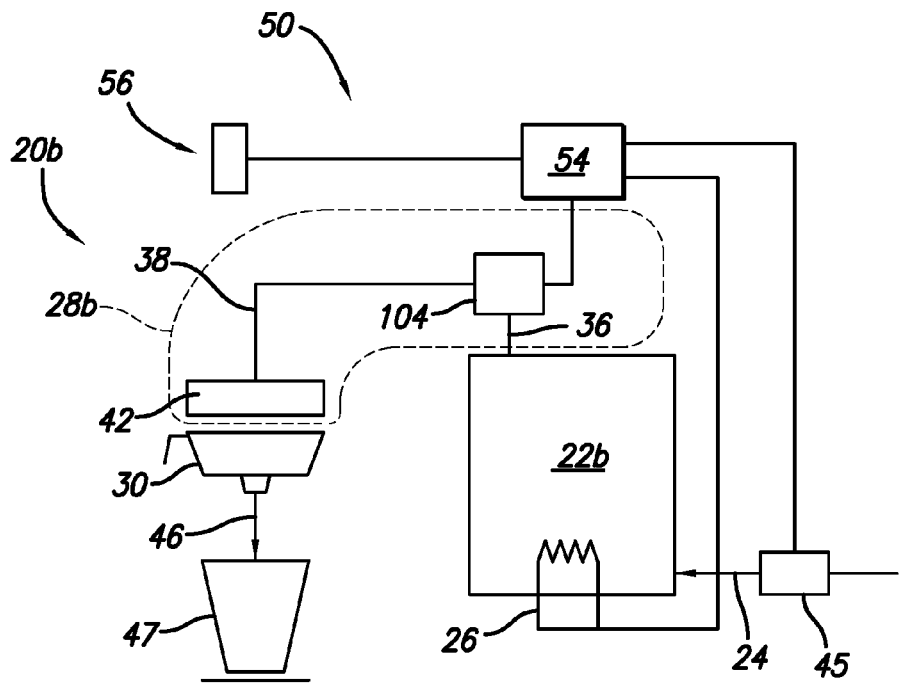
FIG. 3 is an additional embodiment of a general diagrammatic illustration of a brewing system which utilizes a pump to drive water from a reservoir.

With reference to FIG. 3, the brewer shown in FIG. 3 is similar to that as shown in FIGS. 1 and 2. In FIG. 3, the driving device 104 which moves water from the reservoir 22*b* to the spray head 42 is a pump mechanism. Control of the pulse brew routine controls the speed, timing, flow rate and other characteristics of pumping by the pump mechanism. The pump mechanism may be any of those which are currently available or hereinafter developed to move water from the heated reservoir 22b to the spray head 42. The driving device 104 may be embodied as a gear pump, piston pump, bellows pump, wave pump, peristaltic pump, or any other driving device which is capable of moving water from the reservoir 22b to the spray head 42. An example of such a moving device is shown and described in PCT Application No. PCT/US2004/037106 filed Nov. 5, 2004 and assigned to the assignee of the present disclosure and the associated United States patent application and any subsequently filed applications claiming priority from these applications and all of such applications being incorporated herein in its entirety.

In use, the controller 54 is generally preprogrammed with various settings corresponding to the characteristics of the pulse brew system. The settings may include, but are not limited to, the volume of water which is dispensed during each brew cycle, the length of time during which water is not dispensed between neighboring pulse brew periods, the length of time for an initial on-time, often referred to as a pre-wet time, and the total period of time for dispensing a given volume of water. The settings may also include selected off-time and on-time patters, the volume of water flowing during a pulse routine, and the flow rate during a dispensing cycle.

It should be noted that the control mechanism 56 may also include other settings which are independently controlled or controlled in conjunction with the control interface 60. These settings are generally of known construction such as a "half (½) pot," "full pot," "single cup." For example, if a user wishes to use the brewing system 20 to produce a half batch or half pot of coffee, the half pot could be selected. These types of settings are used in prior art machines so as to facilitate ease of use of the brewer. In a brewing system 20, the brewer may include a substance container 30 such as a brewing funnel for retaining brewed beverages in a drip coffee maker. Additionally, the system may be configured to accommodate the above-noted funnel, a single cup or "pod" retaining device as well as, an espresso head. The use of these different brewing configurations and the ability to select these configurations from the control mechanism 56 is included in this disclosure.

Once the user has selected the type of brew, if necessary, the user can then operate the control interface 60 to increase or decrease the strength of the coffee produced. It should be noted that generally once the type of brew, half pot, full pot, single cup, etc., is selected the volume of water to be dispensed over the brewing substance during the brewing cycle generally will be fixed. For example, a full pot may use 64 ounces of water, whereas a half pot would use 32 ounces of water. (Some variations on these volumes may occur depending on the type of coffee being brewed and the accommodations for water absorption during the brewing process.) Once the volume is selected or "fixed" the controller 54 can be used to modify the pulse brew routine to provide a desired result. As noted above, one of the objectives in this disclosure is to provide ease of use for the user. As such, many of the pulse brew steps will be automatically handled by the controller 54.

In one embodiment, by no way intended to be the only embodiment or in any way limiting this disclosure, a user can adjust the control interface 60 to increase the strength of the coffee. In this embodiment, increasing the strength of the coffee causes the controller to place intervals of time during which no water is dispensed over the brewing substance throughout the brew cycle. The brew cycle is defined as a period during which the full volume of water is dispensed over the brewing substance. By placing these intervals during which no water is dispensed, often referred to as "off-times", the brewing substance is allowed to steep and saturate with water. This may tend to increase the amount of flavorings, oils, soluble and other particulate matter which may be flushed from the brewing substance to create the brewed beverage. As of such, the resulting flavor of the coffee may be "stronger."

Any number of configurations of the pulse brewing routine can be preprogrammed into the controller based on any number of considerations including regional preferences, types and quantities of coffee to be used with the system as well as other criteria.

Additionally, the control interface 60 coupled to the controller 54 may be configured to provide a generally continuous range of pulse brew routine controls or may be programmed to provide more discreet or finite control limits. In this regard, instead of making minor incremental adjustments throughout the entire range of control interface selections, a limited number, perhaps 4-10 discreet settings, may be provided. Reference to discreet settings is, by no means, intended to limit the range of settings. Instead, a full range of settings including all combinations of finite settings and generally continuous settings is intended and incorporated in this disclosure. The controller 54 and mechanism 56 may be configured to selectively override the interface 60 to provide increased or decreased control of the pulse brew routine. The system may include by pass control to control the amount of water added to the finished brew but not dispensed over the brewing substance.

Figure 5:
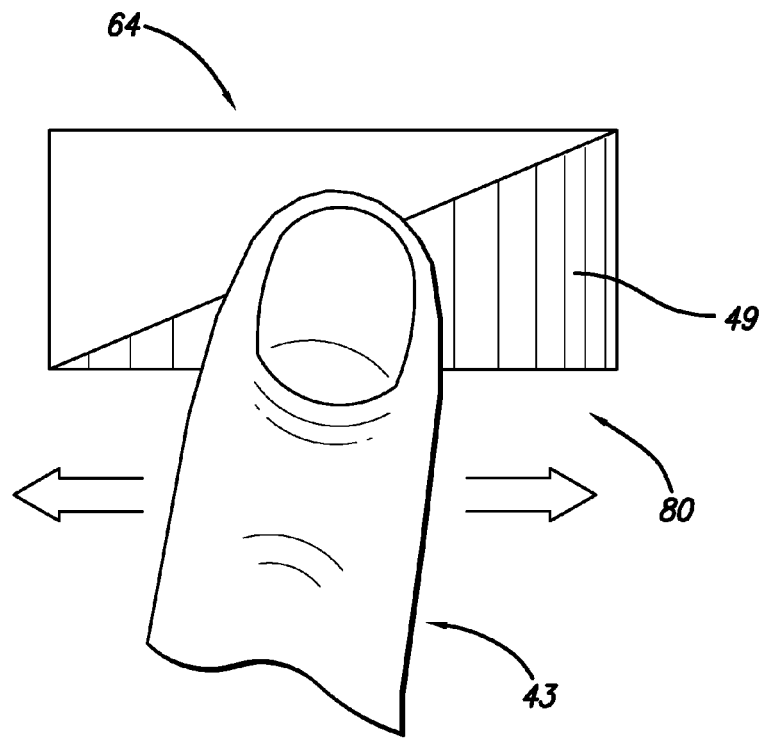
FIG. 5 is another embodiment of a control mechanism using a touch control panel.

With regard to the discreet settings, the user can position the control interface to very discreet settings or on a somewhat continuous setting interface (for example as shown in FIG. 5) the settings can be adjusted based on the position selected by the user. In this regard, the setting chosen at the interface can be rounded up or rounded down by the programming or controller depending on the stopping point of the user control.

Figure 7:
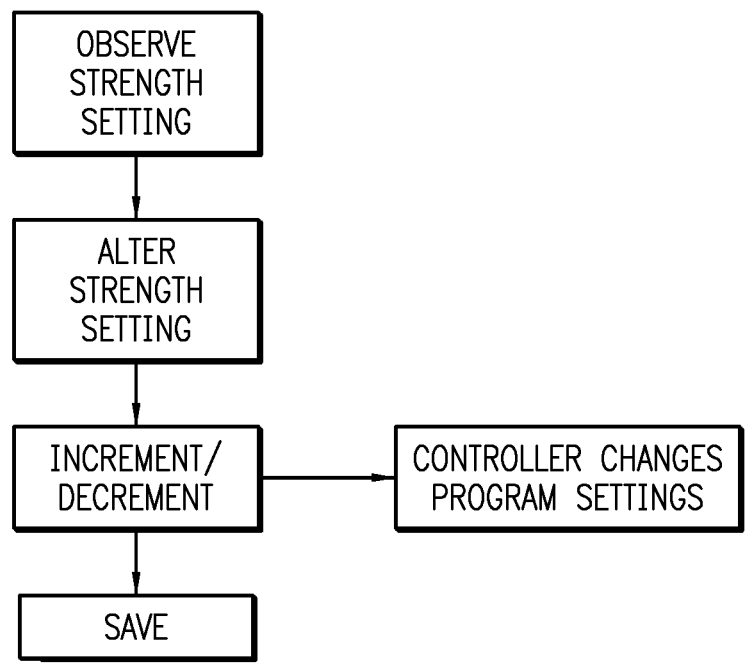
FIG. 7 is a flow chart illustrating one embodiment of steps involved in controlling the control assembly.

With reference to FIG. 7, a series of steps is provided to help describe the control of the control assembly in relation to the beverage system 20. In its most basic form, the user approaches the machine after it has been set up for purposes of brewing or otherwise producing a beverage 46. The user observes the current status of the brew strength on the display 64. The user then makes a decision to alter the strength of the beverage, either increasing or decreasing the strength from the current setting. The user can control this setting by use of the control interface which includes, but is not limited to, those interfaces as described in this disclosure and shown in FIGS. 4-6. The system will utilize the user's control of the control interface 60 of the control mechanism 56 to alter the control of water transferred from the heated water reservoir 22 to the spray head 42.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure.

The invention claimed is:

1. A beverage brewing system for combining heated water with a beverage substance to produce and control the strength of a beverage, the brewing system including
a heated water reservoir,
a controllable water delivery system coupled to the heated water reservoir and to a preprogrammed controller to facilitate controlled movement of water from the heated water reservoir to a beverage substance container positioned in communication with the water delivery system for receiving water and infusing a beverage substance contained in the beverage substance container, the preprogrammed controller having preprogrammed settings for the volume of water which is dispensed during each brew cycle, the length of time during which water is not dispensed between neighboring pulse brew periods, the length of time for an initial on-time, and the total period of time for dispensing a given volume of water,
a brew water control system coupled to the preprogrammed controller and operable to provide adjustable, approximate, non-incremental, non-discrete user control of defined beverage characteristics to control a volume of water provided by the water delivery system, the preprogrammed controller receiving and interpreting the user adjusted, approximate, non-discrete control information and being operable to adjust the timing control of the volume of water dispensed by the controllable water delivery system to the beverage substance container in a discrete manner so as to affect the strength of the beverage being brewed.

2. The beverage brewing system of claim 1, where in the brew water control system includes a control mechanism operated by at least one generally continuously controllable switch to at least one of increase and decrease programmable characteristics of the beverage produced by the system in an approximate, non-discrete manner.

3. The beverage brewing system of claim 2, in which the control mechanism includes a touch panel display operable by a user to said at least one of increase and decrease said programmable characteristics of the beverage produced by the beverage brewing system.

4. The beverage brewing system of claim 2, in which the control mechanism includes a visual display device and a user control operable by a user to said at least one of increase and decrease said programmable characteristics of the beverage produced by the beverage brewing system.

5. The beverage brewing system of claim 2, in which the control mechanism includes a technology device and reader, wherein the technology device is operable by a user in at least proximity to the reader to control programmed characteristics of the beverage produced by the beverage brewing system.

6. The beverage brewing system of claim 2, further comprising a technology device and reader, wherein the technology device is operable by a user in at least proximity to the reader coupled to the preprogrammed controller to provide initial control program characteristics of the beverage to be produced by the beverage brewing system and which characteristics are controllably adjustable using the least one generally continuously controllable switch.

7. The beverage brewing system of claim 2, further comprising the at least one generally continuously controllable switch is a touch panel control including indicia of increased control and decreased control over a generally continuous control range.

8. The beverage brewing system of claim 2, further comprising the at least one generally continuously controllable switch is a slider device coupled with indicia of increased control and decreased control over a generally continuous finite control range.

9. A method for brewing a beverage using a beverage brewing system including a heated water reservoir, a controllable water delivery system coupled to the heated water reservoir and to a preprogrammed controller, a beverage substance container in communication with the water delivery system, and a brew water control system coupled to the preprogrammed controller for providing adjustable, approximate, non-discrete user control of the water delivery system, the method comprising the steps of:
providing the preprogrammed controller having preprogrammed settings for the volume of water which is dispensed during each brew cycle, the length of time during which water is not dispensed between neighboring pulse brew periods, the length of time for an initial on-time, and the total period of time for dispensing a given volume of water,
operating the brew water control system to a selected, approximate, non-incremental, non-discrete level of characteristic to be controlled;
transmitting the selected characteristic to the preprogrammed controller;
interpreting the selected characteristic by adjusting the non-discrete selection into a discrete control selection whereby a volume of water to be dispensed to a brewing substance is fixed; and
operating the preprogrammed controller to control the water delivery system in response to a user selection of a stronger or weaker brew whereby the timing of dispensing of the volume of water is selected by the user and whereby the timing during which no water is dispensed to the brewing substance is controlled.

10. The method for brewing the beverage as in claim 9, the brew water control system further comprising providing a touch panel control for controllably selecting the level of characteristic, operating the touch panel to provide an approximate, non-discrete control signal to the controller.

11. The method for brewing the beverage as in claim 9, the brew water control system further comprising at least one generally continuously controllable switch in the form of a slider device coupled with indicia of increased control and decreased control over a generally continuous finite control range.

12. The method for brewing the beverage as in claim 9, in which the brew water control system includes a visual display device and a user control, further comprising the step of operating the user control to effect a representation on the visual display to at least one of increase and decrease programmed characteristics of the beverage produced by the beverage brewing system.

13. The method for brewing the beverage as in claim 10, the brew water control system including a technology device and a reader coupled to the controller, the method further comprising:
passing the technology device relative to the reader for transferring information, and operating the touch panel to at least one of increase and decrease programmed characteristics of the beverage produced by the beverage brewing system.

* * * * *